United States Patent
Homma

(10) Patent No.: US 7,426,343 B2
(45) Date of Patent: Sep. 16, 2008

(54) HOLOGRAPHIC OPTICAL DEVICE, CAMERA FINDER INDICATION, AND CAMERA

(75) Inventor: Itaru Homma, Tokyo (JP)

(73) Assignee: Nikon Corporation, Tokyo (JP)

( * ) Notice: Subject to any disclaimer, the term of this patent is extended or adjusted under 35 U.S.C. 154(b) by 237 days.

(21) Appl. No.: 10/537,657

(22) PCT Filed: Dec. 3, 2003

(86) PCT No.: PCT/JP03/15457

§ 371 (c)(1),
(2), (4) Date: Jun. 6, 2005

(87) PCT Pub. No.: WO2004/053575

PCT Pub. Date: Jun. 24, 2004

(65) Prior Publication Data

US 2006/0034603 A1 Feb. 16, 2006

(30) Foreign Application Priority Data

Dec. 6, 2002 (JP) ............................. 2002-355721

(51) Int. Cl.
*G03B 17/20* (2006.01)
*G03H 1/22* (2006.01)
*G02F 1/13* (2006.01)

(52) U.S. Cl. .................... 396/288; 396/296; 359/13; 349/11

(58) Field of Classification Search ................ 396/296, 396/288, 290; 359/1–9, 24, 13; 349/11
See application file for complete search history.

(56) References Cited

U.S. PATENT DOCUMENTS

| | | | |
|---|---|---|---|
| 5,978,607 A * | 11/1999 | Teremy et al. | 396/288 |
| 6,115,151 A | 9/2000 | Popovich | |
| 6,169,854 B1 * | 1/2001 | Hasegawa et al. | 396/56 |
| 6,556,179 B2 * | 4/2003 | Iwane et al. | 345/87 |
| 7,016,604 B2 * | 3/2006 | Stavely et al. | 396/111 |
| 2001/0016084 A1* | 8/2001 | Pollard et al. | 382/317 |
| 2003/0147112 A1* | 8/2003 | Mukawa | 359/15 |

FOREIGN PATENT DOCUMENTS

| | | |
|---|---|---|
| JP | 4-324844 | 11/1992 |
| JP | 6-59256 | 3/1994 |
| JP | 6-308471 | 11/1994 |
| JP | 7-319032 | 12/1995 |
| JP | 10-048592 | 2/1998 |
| JP | 11-271536 | 10/1999 |
| JP | 2001-51335 | 2/2001 |
| JP | 2002-122906 | 4/2002 |
| JP | 2002-221710 | 8/2002 |
| WO | WO99/24852 | 5/1999 |

\* cited by examiner

*Primary Examiner*—W. B. Perkey
(74) *Attorney, Agent, or Firm*—Miles & Stockbridge P.C.

(57) ABSTRACT

The present invention relates to a holographic optical element (8), a viewfinder display (5, 6, 7) of a camera (1) using thereof, and a camera (1). The purpose of the present invention is to show various superimposed displays for various information with securing a bright viewfinder image. In the holographic optical element according to the present invention, a liquid crystal (13) whose orientation is changeable and a liquid crystal (14) whose orientation is fixed are arranged alternately with a striped shape between the transparent members (12*a*) (12*b*) on which the transparent electrodes (11*a*) (11*b*) are formed facing with each other.

25 Claims, 9 Drawing Sheets

12a
(12b)

29a (29b)

17

29

HOLOGRAPHIC OPTICAL DEVICE, CAMERA FINDER INDICATION, AND CAMERA

TECHNICAL FIELD

The present invention relates to a holographic optical element, a viewfinder display of a camera, and a camera.

BACKGROUND ART

It has been known a viewfinder display that shows various information such as a focus detection area and the like in a viewfinder of a camera together with an object image, which is a so-called superimposed display. As a viewfinder display of this kind, a transparent type liquid crystal display or a high polymer dispersion type liquid crystal display capable of displaying various information arranged in the vicinity of a screen has been proposed in such as Japanese Patent Application Laid-Open Nos. 4-324844 and 10-48592. Moreover, in Japanese Patent Application Laid-Open No. 7-319032, it has been proposed a construction that a light projection system such as a light-emitting diode projects light to a micro-prism locating in the vicinity of a screen and various information can be displayed by the reflected light.

However, in the viewfinder display using a transparent type liquid crystal display, since the transmittance of the transparent type liquid crystal display is low, it becomes difficult to observe the image of the viewfinder (various information as well as the object image). Moreover, in the viewfinder using a high polymer dispersion type liquid crystal display, although the transmittance of the high polymer dispersion type liquid crystal display is high, light is diffused upon applying no-voltage, so that it becomes a restriction on a viewfinder display. Furthermore, in the above-described viewfinder using a micro-prism, it is difficult to show various information with a fine display.

DISCLOSURE OF THE INVENTION

The present invention is made in view of the aforementioned problems and has an object to provide a holographic optical element, a viewfinder display of a camera, and a camera that makes it possible to show various superimposed displays for various information with securing a bright viewfinder image.

In order to solve the aforementioned problems, the present invention provides a holographic optical element which includes a pair of board-shaped transparent members arranged with a distance facing with each other, transparent electrodes formed on the respective transparent members and facing with each other, a liquid crystal whose orientation is changeable, and a liquid crystal whose orientation is fixed. The orientation changeable liquid crystal and the orientation-fixed liquid crystal are arranged alternately with a striped shape between the transparent members on which the transparent electrodes are formed facing with each other.

In the holographic optical element of the present invention, it is preferable that the orientation-fixed liquid crystal is an ultraviolet-setting liquid crystal.

In the holographic optical element of the present invention, it is preferable that the holographic optical element diffracts light upon applying no-voltage since the orientation of the liquid crystal and the orientation of the orientation-fixed liquid crystal are different upon applying no-voltage, and upon applying voltage, the orientation of the liquid crystal varies so that the orientation of the liquid crystal and the orientation of the orientation-fixed liquid crystal become the same.

In the holographic optical element of the present invention, it is preferable that the holographic optical element diffracts light upon applying voltage since the orientation of the liquid crystal and the orientation of the orientation-fixed liquid crystal are different upon applying voltage, and upon applying no-voltage, the orientation of the liquid crystal varies so that the orientation of the liquid crystal and the orientation of the orientation-fixed liquid crystal become the same.

The present invention provides a viewfinder display of a camera displaying given information together with an object image with superimposed manner, the viewfinder display uses the aforementioned holographic optical element.

In the viewfinder display of a camera of the present invention, it is preferable that the transparent electrodes are arranged on the transparent members such that the transparent electrodes form a figure shape and a letter shape, and the figure and the letter are displayed as the given information.

In the viewfinder display of a camera of the present invention, it is preferable that the transparent electrodes are arranged on the transparent members such that the given information is displayed as a dot-matrix.

In the viewfinder display of a camera of the present invention displaying given information together with an object image with superimposed manner, it is preferable that the viewfinder display using in combination with a plurality of holographic optical elements according to the present invention.

The present invention provides a camera arranging the viewfinder display of a camera according to the present invention.

EMBODIMENT OF THE INVENTION

Each embodiment of the present invention is explained below with reference to accompanying drawings.

First Embodiment

A single-lens-reflex camera equipped with a viewfinder display using a holographic optical element according to a first embodiment of the present invention is explained.

Figure 1:
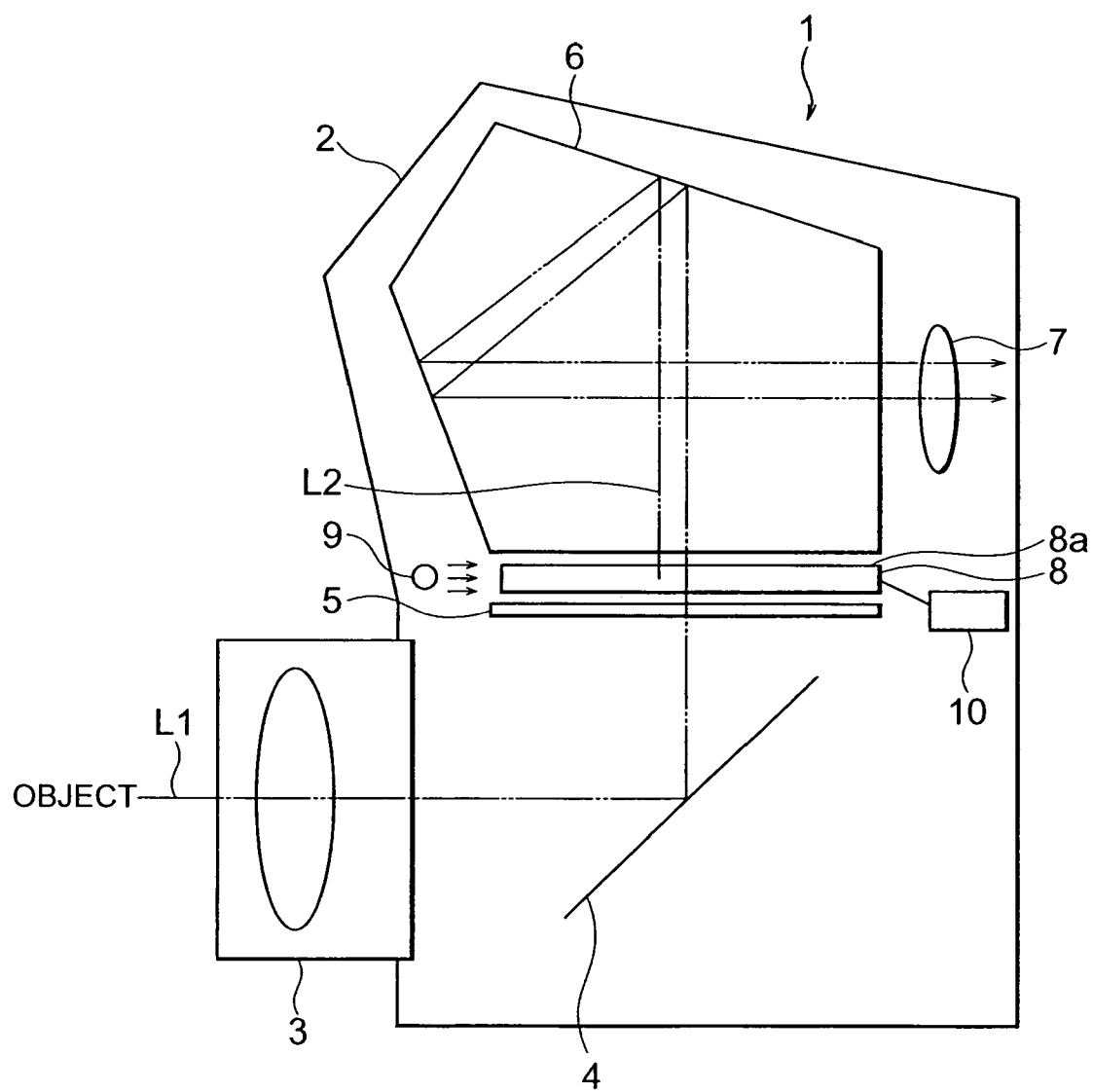
FIG. 1 is a schematic diagram showing a single-lens-reflex camera according to a first embodiment of the present invention.

At first, construction and operation of the single-lens-reflex camera according to the first embodiment of the present invention is explained. FIG. 1 is a schematic diagram showing a single-lens-reflex camera according to a first embodiment of the present invention. In FIG. 1, a single-lens-reflex camera 1 is equipped with a photographic lens 3 removably attached to a camera body 2, a quick return mirror 4 for reflecting light from an object through the photographic lens 3, a screen 5 locating in a position conjugate with a photosensitive surface of a photographic film (not shown), a pentagonal roof prism 6 and an eyepiece 7 for observing the object image formed on the screen 5.

In the camera body 2, a holographic optical element 8, which is explained later, is locating in the vicinity of the screen 5. A light source 9 for illuminating the holographic optical element 8 is arranged near a side of the holographic optical element 8. Moreover, a driver 10 for electrically controlling the optical characteristic of the holographic optical element 8 is connected to the holographic optical element 8.

In a single-lens-reflex camera having the above-described construction, object light L1 from an object (not shown) passes through the photographic lens 3 and is reflected by the quick return mirror 4 and forms an image on the screen 5. The light passing through the screen 5 passes through the holographic optical element 8, is reflected by the pentagonal roof prism 6, and observed as an object image by a photographer (a viewfinder observer) through the eyepiece 7.

Upon photographing the object, the quick return mirror 4 is removed from the optical path so that the object light L1 reaches the photographic film to expose the film (the object is photographed on the film).

Then, light emitted from the light source 9 is incident to the holographic optical element 8, and diffracted by the holographic optical element 8 in the direction of the pentagonal roof prism 6 (upward). Here, the holographic optical element 8 is controlled by the driver 10 so as to display given information (various information such as a focus detection area necessary for the photographer) in the field of the viewfinder. The diffraction and the construction of the holographic optical element 8 are explained later in detail.

The diffracted light L2 is reflected by the pentagonal roof prism 6 and observed as a given information by the photographer through the eyepiece 7.

With the construction described above, the given information is displayed in the field of the viewfinder together with the object image (superimposed display), so that the photographer can observe the given information and the object image at a time.

The holographic optical element 8 which is the characteristic portion of the first embodiment is explained in detail.

Figure 2:
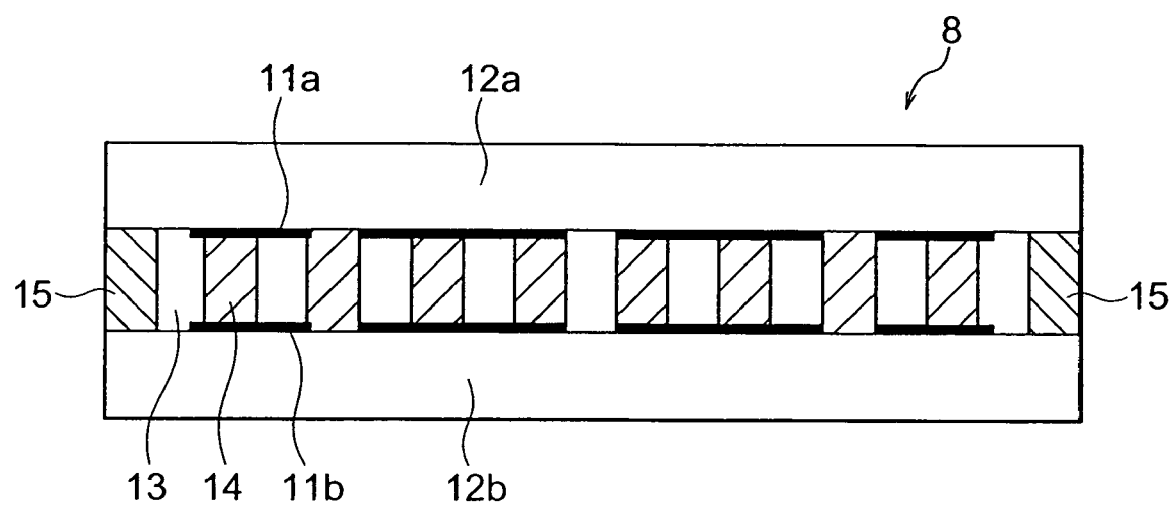
FIG. 2 is a sectional view showing a holographic optical element according to the first embodiment of the present invention.

The construction of the holographic optical element 8 is explained with reference to FIG. 2. FIG. 2 is a sectional view showing a holographic optical element according to the first embodiment of the present invention.

Figure 3A:
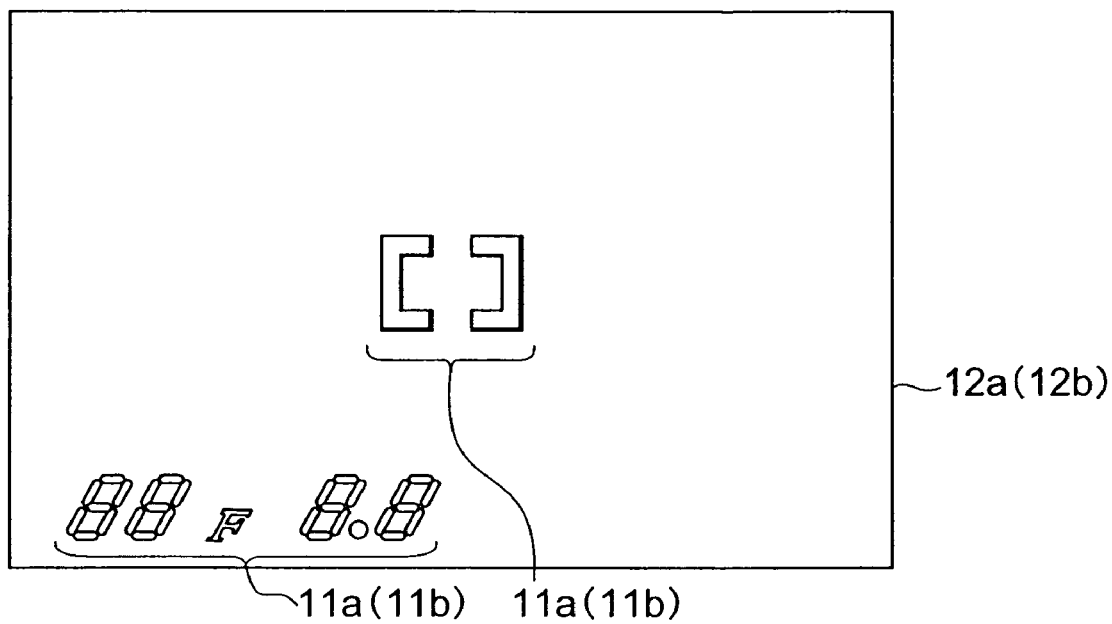
FIGS. 3A and 3B are diagrams respectively showing a transparent electrode for the holographic optical element according to the first embodiment of the present invention and an example of information displayed in the viewfinder.

In the holographic optical element 8 shown in FIG. 2, transparent electrodes 11a and 11b are applied on a pair of transparent glass plates 12a and 12b arranged with a distance facing with each other. These transparent electrodes 11a and 11b are arranged facing with each other. In the present embodiment, these transparent electrodes 11a and 11b have the same shape with each other, in other words, the shapes correspond with each other upon seeing from upward in FIG. 2 (in FIG. 1, seen from the pentagonal roof prism 6 side) so as to shape a letter or a figure as shown in FIG. 3A to be arranged on each glass plate 12a or 12b. FIG. 3A is a diagram showing a transparent electrode 11a or 11b for the holographic optical element 8 according to the first embodiment of the present invention. With the shape of the transparent electrode 11a or 11b, the holographic optical element 8 makes it possible to display a given information composed of figures and letters in the field of the viewfinder by diffracting the light from the light source 9.

The transparent electrodes 11a and 11b are connected to the above-described driver 10 by wiring (not shown) and voltage can be applied to these transparent electrodes 11a and 11b facing with each other. Between the glass plates 12a and 12b equipped with these transparent electrodes 11a and 11b, a liquid crystal 13 and an orientation-fixed liquid crystal 14 are arranged alternately with a striped shape extending in the direction to the end of the holographic optical element 8 (horizontal direction in FIG. 2). The liquid crystal 13 changes orientation thereof by applying voltage/no-voltage. On the other hand, the orientation-fixed liquid crystal 14 is a ultraviolet-setting liquid crystal which does not change orientation thereof regardless of applying voltage/no-voltage. In the state without applying voltage, orientation of the liquid crystal 13 is aligned with that of the ultraviolet-setting liquid crystal 14. Accordingly, by applying voltage between the transparent electrodes 11a and 11b facing with each other by means of the driver 10, the orientation of the liquid crystal 13 locating between the transparent electrodes 11a and 11b changes.

Moreover, the end portions of the holographic optical element 8 are sealed by a sealant 15.

Figure 4A:
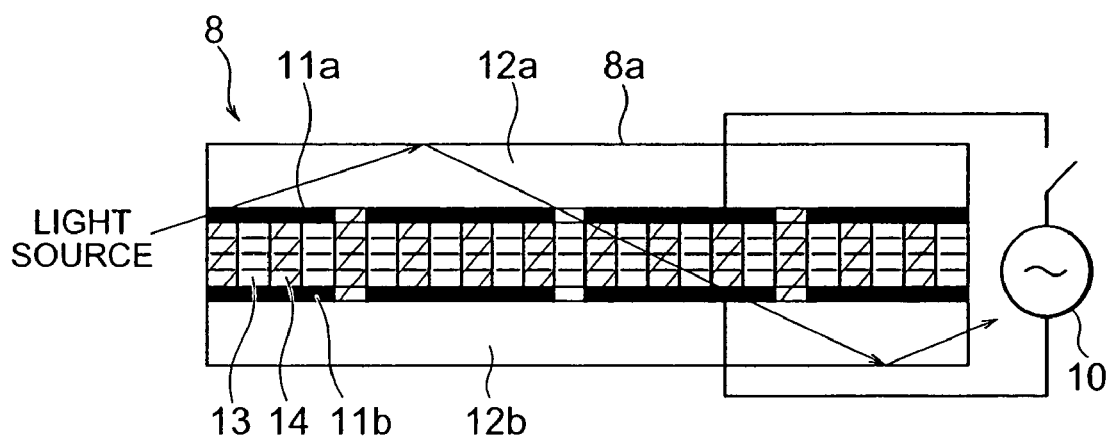
FIGS. 4A and 4B are diagrams explaining operation principles of the holographic optical element according to the first embodiment of the present invention upon applying no-voltage and upon applying voltage, respectively.
Figure 4B:
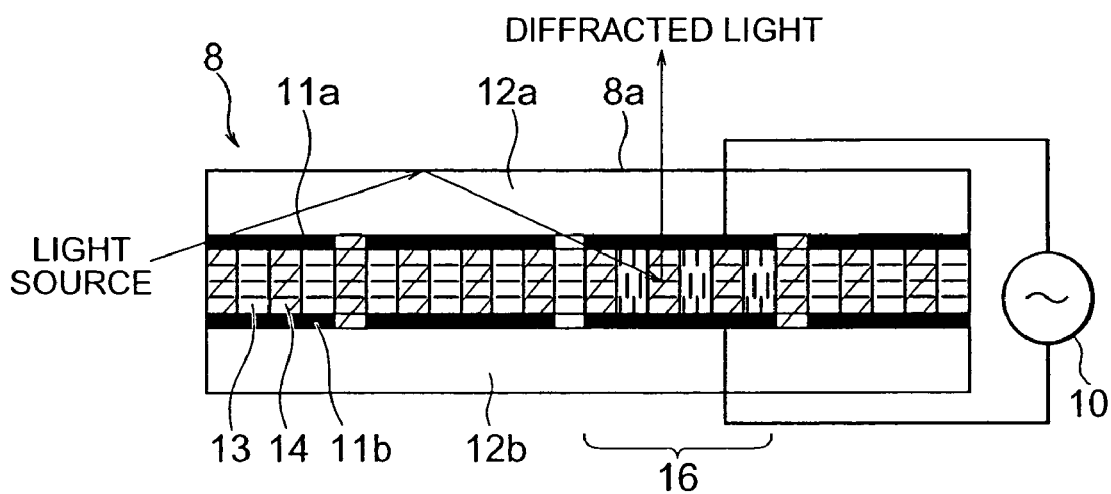

Then, the operation principle of the holographic optical element 8 is explained with reference to FIGS. 4A and 4B. FIGS. 4A and 4B are diagrams explaining operation principle of the holographic optical element according to the first embodiment of the present invention upon applying no-voltage and upon applying voltage, respectively.

As shown in FIG. 4A, upon applying no-voltage between the transparent electrodes 11a and 11b, orientation of the liquid crystal 13 is the same as that of the ultraviolet-setting liquid crystal 14 and is horizontal direction of FIG. 4A. Accordingly, refractive indices of the liquid crystal portion 13 and 14 of the holographic optical element 8 become substantially equal. Therefore, since there is no difference in refractive indices of the liquid crystal 13 and 14, the light emitted from the light source 9 and incident to the holographic optical element 8 from a side, passes through the element 8 without being diffracted and comes out from the opposite side of the incident side. Upon applying no-voltage, the light from the light source 9 passes through the holographic optical element 8 in this manner. The transmitted light is not led to the eyepiece 7, so that the photographer observes only the object image through the eyepiece 7.

Figure 3B:
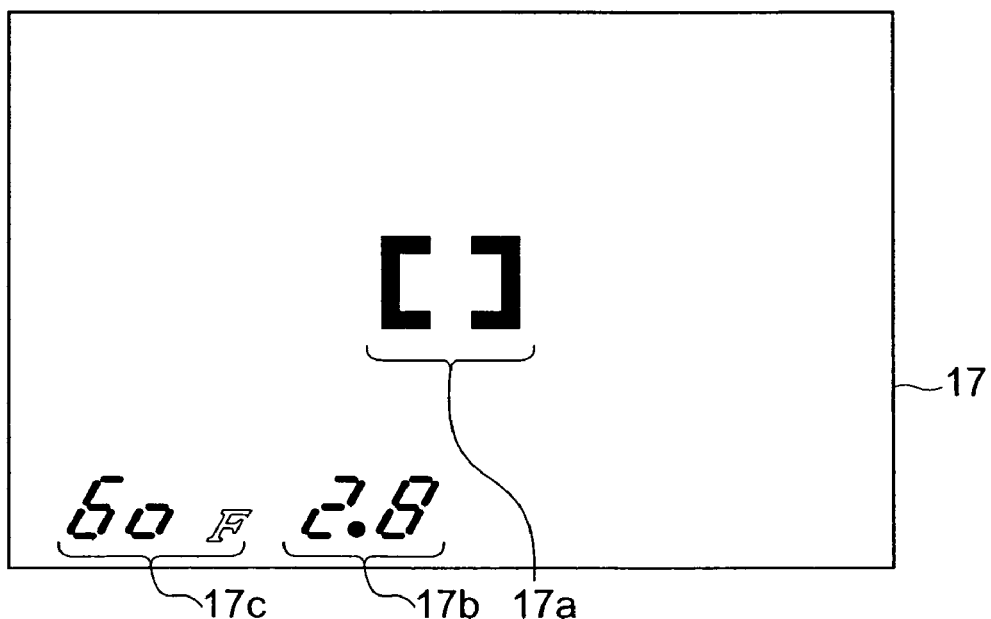

On the other hand, when applying the voltage between the transparent electrodes 11a and 11b by the driver 10, the orientation of the liquid crystal 13 changes to vertical direction in FIG. 4B. The orientation of the ultraviolet-setting liquid crystal 14 does not change from the state upon applying no-voltage and is horizontal direction in FIG. 4B. Accordingly, in a liquid crystal portion 16 locating between the transparent electrodes where voltage is applied by the driver 10 in the holographic optical element 8, a high refractive index portion (vertically oriented liquid crystal 13 in FIG. 4B) and a low refractive index portion (horizontally oriented ultraviolet-setting liquid crystal 14 in FIG. 4B) are arranged alternately with a striped shape, in other words, refractive index of the liquid crystal portion 16 changes with a striped shape (in the shape of a diffraction grating). Accordingly, the light emitted from the light source 9 and incident into the holographic optical element 8 from a side is diffracted at the liquid crystal portion 16 in the direction satisfying Bragg's diffraction condition. In the present embodiment, Bragg's diffraction condition is set such that the light from the light source 9 is diffracted upward in the vertical direction in FIG. 4B. Accordingly, the light passing through the holographic optical element 8 is diffracted upward in FIG. 4B (in the direction of the pentagonal roof prism) and comes out from the exit surface 8a. Upon applying voltage, the light from the light source 9 is diffracted by the holographic optical element 8 in this manner, and led to the eyepiece 7 through the pentagonal roof prism 6. Accordingly, the holographic optical element 8 is controlled by applying voltage or no-voltage to each portion of the transparent electrode by means of the driver 10, so that given information is displayed in various ways in the field of the viewfinder superimposing the object image. In the first embodiment, an example of information (focus detection area 17a, exposure time 17b, and f-number 17c) displayed in the field of the viewfinder 17 is shown in FIG. 3B. FIG. 3B is a diagram showing an example of information displayed in the field of the viewfinder according to the first embodiment of the present invention.

As described above, by equipping a holographic optical element composed of a liquid crystal and an orientation-fixed liquid crystal into the viewfinder display, a single-lens-reflex camera according to the first embodiment of the present invention makes it possible to show various superimposed displays for various information with securing a bright viewfinder image.

Variations of the holographic optical element 8 according to the first embodiment are explained below.

The above-described holographic optical element 8 according to the first embodiment diffracts basically monochromatic light. Accordingly, various information is displayed in monochromatic light in the field of the viewfinder. In the present invention, construction of a holographic optical element is not limited to this.

Figure 5:
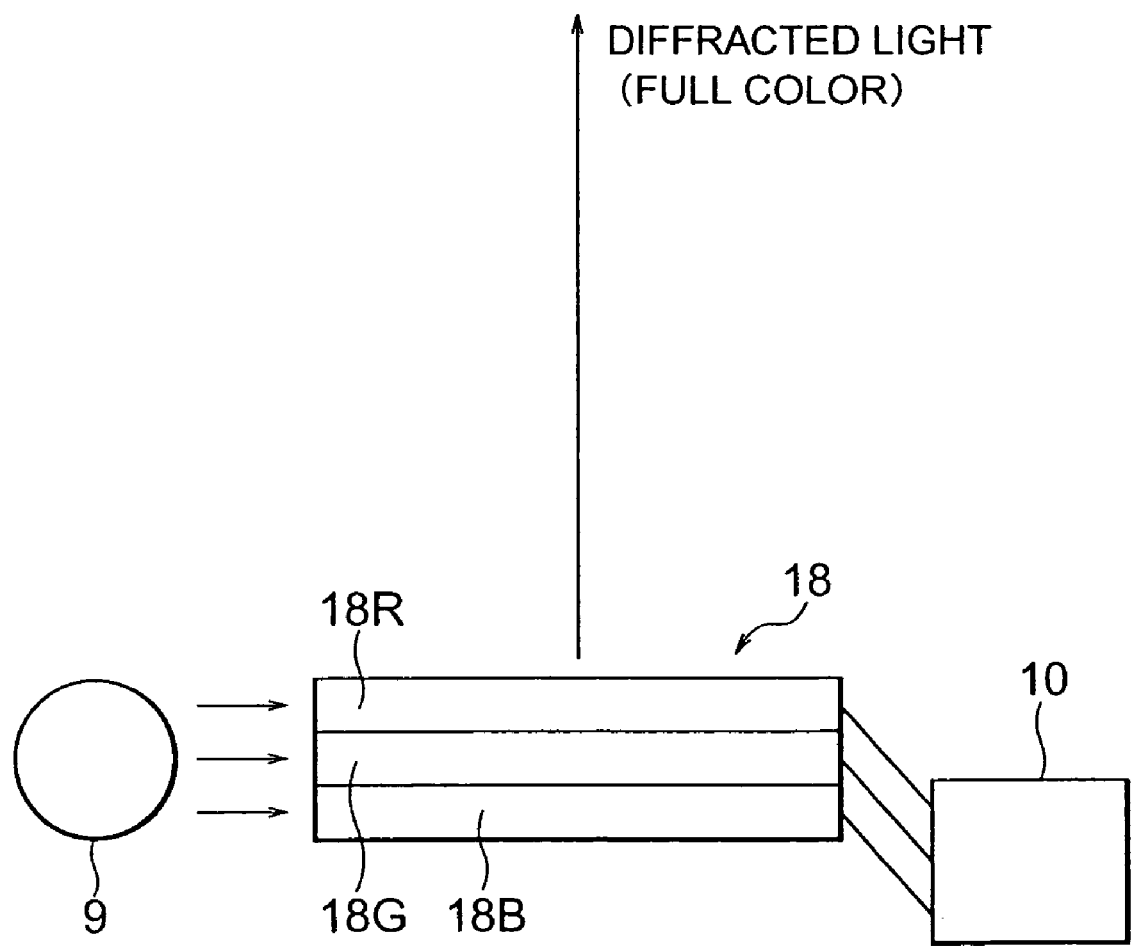
FIG. 5 is a diagram showing another example of the holographic optical element.

FIG. 5 is a diagram showing another example of the holographic optical element. A holographic optical element 18 shown in FIG. 5 is constructed by three kinds of holographic optical elements composed of a holographic optical element 18R diffracting red light, a holographic optical element 18B diffracting blue light in the same direction of the red light, and a holographic optical element 18G diffracting green light in the same direction of the red light.

Such a holographic optical element 18 is installed in a viewfinder display. The light source 9 illuminates each holographic optical element 18R, 18G, and 18B with white light and the driver 10 applies voltage to each holographic optical element 18R, 18G, and 18B in turn with time-sharing. Accordingly, upon applying voltage, each holographic optical element 18R, 18G, and 18B diffracts corresponding color of light among white light. Therefore, the holographic optical element 18 makes it possible to diffract each color of light superimposing manner in the same direction.

As described above, the viewfinder display using the holographic optical element 18 makes it possible to display given information in colors in the field of the viewfinder. In addition, given information can be displayed in the field of the viewfinder display in full color by arbitrarily changing diffraction efficiency of each holographic optical element 18R, 18G, and 18B.

In the holographic optical element 8 according to the first embodiment, transparent electrodes 11a and 11b formed on a pair of glass plates 12a and 12b have the same shape and are arranged such that their shapes coincide with each other upon seeing from upward in the figure. However, in the present invention, the shape of the transparent electrode is not limited to this.

For example, a holographic optical element is constructed such that a pair of glass plates on which transparent electrodes are formed with stripes are arranged such that the respective transparent electrode stripes are crossed at right angle forming a grid shape upon seeing from upward. With the construction, the light from the light source can be diffracted at any position where the transparent electrode stripes are crossed upon seeing from upward. Accordingly, a dot can be displayed in the field of the viewfinder corresponding to the position where the transparent electrodes are crossed.

As described above, the viewfinder display using the holographic optical element with the above-described construction makes it possible to display given information in the field of the viewfinder with a dot matrix.

For example, a holographic optical element is constructed such that a transparent electrode forming a figure and a letter or a grid shape is formed on one of a pair of glass plates and a uniform transparent electrode is formed on the other glass plate.

The viewfinder display using the holographic optical element with the above-described construction makes it possible to display given information in the field of the viewfinder similar to the viewfinder display using the above-described each holographic optical element.

In the holographic optical element 8 according to the above-described first embodiment and that according to the variation, orientation of the liquid crystal and that of the ultraviolet-setting liquid crystal are the same upon applying no-voltage. By varying the orientation of the liquid crystal upon applying voltage, difference between refractive index of the liquid crystal and that of ultraviolet-setting liquid crystal is produced and the light is diffracted. In the present invention, the orientation of the liquid crystal is not limited to this.

A holographic optical element is constructed such that the orientation of the liquid crystal and that of the ultraviolet-setting liquid crystal are the same upon applying voltage, and upon applying no-voltage the orientation of the liquid crystal varies so that difference between refractive index of the liquid crystal and that of the ultraviolet-setting liquid crystal is produced resulting in diffracting the light.

A viewfinder display using the holographic optical element with the above-described construction makes it possible to display given information in the field of the viewfinder similar to the viewfinder display using the above-described each holographic optical element.

Figure 6A:
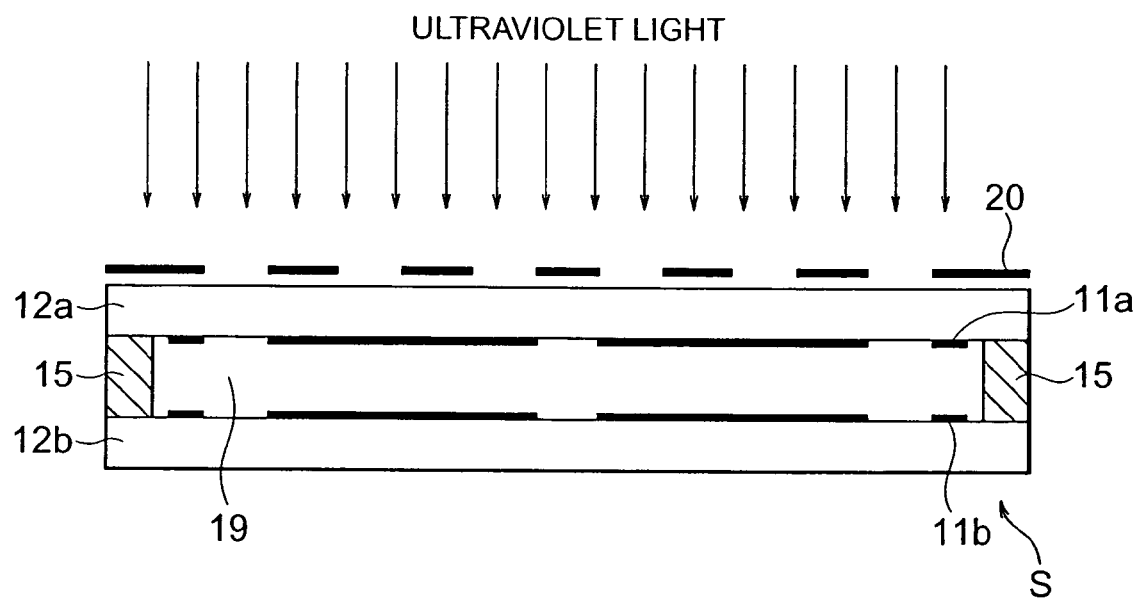
FIGS. 6A and 6B are diagrams explaining a fabrication method of the holographic optical element according to the first embodiment of the present invention.
Figure 6B:
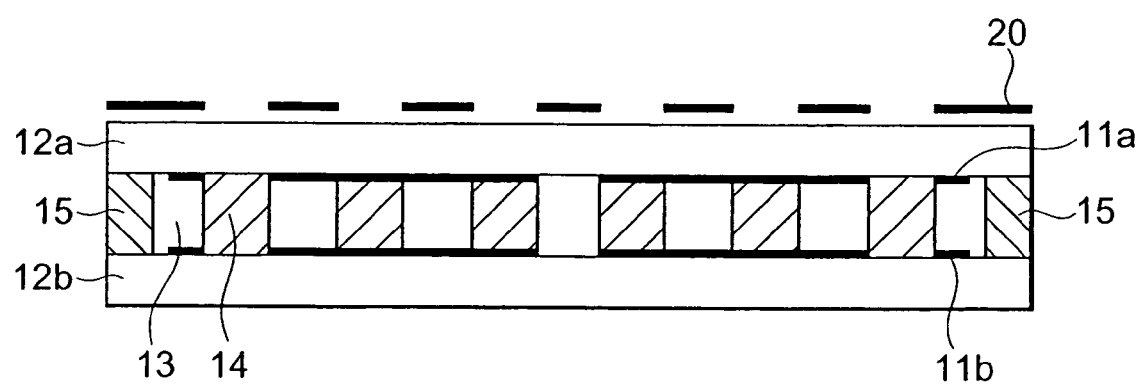

A fabrication method of the holographic optical element 8 according to the above-described first embodiment is explained with reference to FIGS. 6A and 6B. FIGS. 6A and 6B are diagrams explaining a fabrication method of the holographic optical element according to the first embodiment of the present invention.

At first, the above-described transparent electrodes Ha and 11b are formed on each of a pair of glass plates 12a and 12b. The pair of glass plates 12a and 12b are fixed in a state where the transparent electrodes 11a and 11b are spaced and facing each other, and forms a hollow cell S.

Then, the hollow portion of the cell S is filled with a mixture 19 composed of the above-described liquid crystal 13 and the ultraviolet-setting liquid crystal 14. End portions of the cell in which the mixture 19 is filled are sealed by the sealant 15.

Then, a mask 20 having a striped openings is attached on the glass plate 12a of the cell S, and ultraviolet light is illuminated on the glass plate 12a on which the mask 20 is attached (see FIG. 4A). Accordingly, the ultraviolet light is incident into the cell through the openings of the mask 20, and the ultraviolet-setting liquid crystal 14 is polymerized where the ultraviolet light is incident. Therefore, the liquid crystal 13 and the ultraviolet-setting liquid crystal 14 are separated in striped shape in the direction to the end of the cell, and the orientation of the ultraviolet-setting liquid crystal 14 is fixed (see FIG. 4B).

With the above-described fabrication method, the holographic optical element 8 according to the first embodiment can be fabricated. Incidentally, the holographic optical element according to the above-described variation can also be fabricated in the similar manner.

Figure 7A:
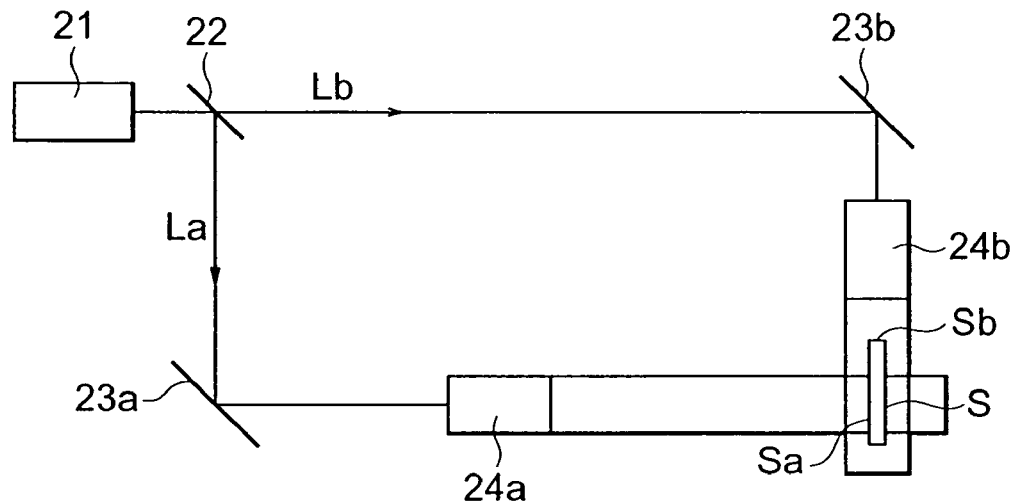
FIGS. 7A and 7B are schematic diagrams showing a device for fabricating the holographic optical element with another fabrication method and an enlarged drawing of a cell portion of FIG. 7A showing wave fronts of bundles of rays, respectively.

Another fabrication method of the holographic optical element is explained with reference to FIGS. 7A and 7B. FIG. 7A is a schematic diagram showing a device for fabricating the holographic optical element with another fabrication method.

In this fabrication method also, similar to the cell S used in the above-described fabrication method, the cell S in which the mixture of the liquid crystal and the ultraviolet-setting liquid crystal is filled is used.

Figure 7B:
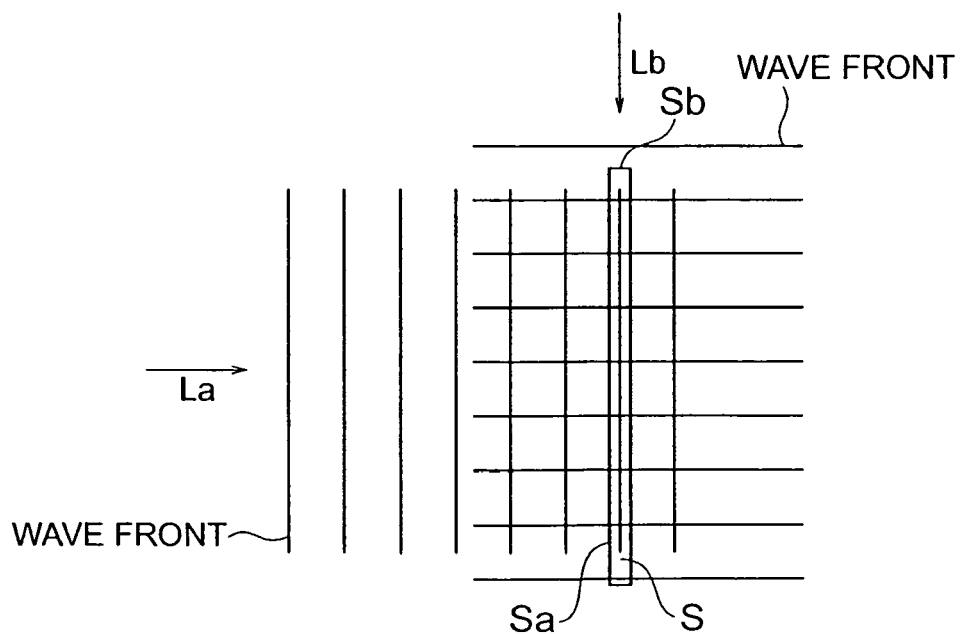

In FIGS. 7A and 7B, an ultraviolet laser beam emitted from a light source 21 is divided into two light beams La and Lb by a beam splitter 22, and each beam is incident into each mirror 23a or 23b. The light beams La and Lb are reflected by respective mirrors 23a and 23b, and incident into respective beam expanders 24a and 24b. Here, the light beams La and Lb expand their beam diameters by the beam expanders 24a and 24b, respectively. The above-described cell S is arranged at a crossing position of the expanded light beams La and Lb. Accordingly, the light beams La and Lb are incident to the cell S from glass surfaces Sa and Sb of the cell, respectively.

Here, the light beams La and Lb interfere to form a bright and dark striped pattern, so that bright portions and dark portions are formed on the cell S. Accordingly, the ultraviolet-setting liquid crystal is polymerized at the bright portions. Thereby, the liquid crystal and the ultraviolet-setting liquid crystal separate in a striped shape in the direction to the end of the cell, and the orientation of the ultraviolet-setting liquid crystal is fixed. Here, FIG. 7B is an enlarged view of the cell portion of FIG. 7A showing wave fronts of bundles of rays La and Lb. In FIG. 7B, the crossing points where respective wave fronts intersect are bright positions where the ultraviolet-setting liquid crystal is polymerized.

With this fabrication method described above, the above-described holographic optical element can be fabricated.

Second Embodiment

Then, a viewfinder display for compact camera according to the second embodiment of the present invention is explained.

Figure 8:
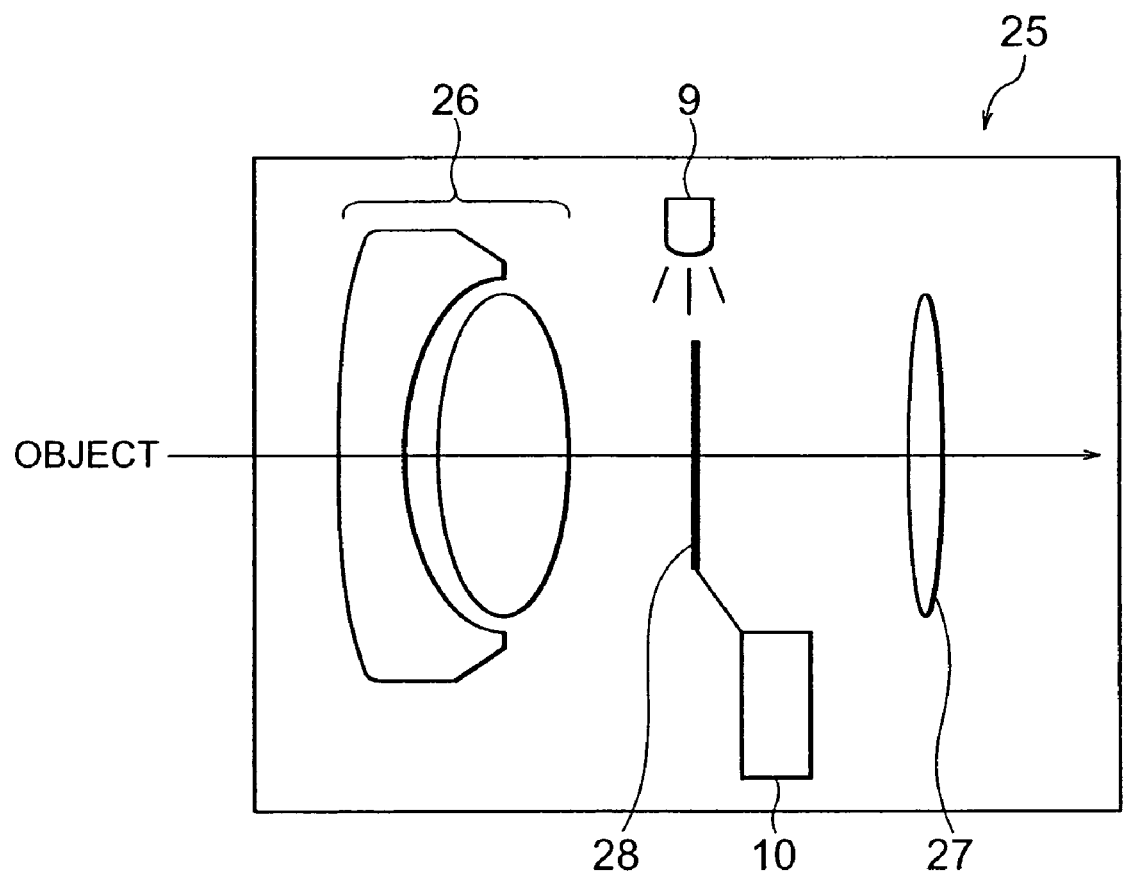
FIG. 8 is a schematic view showing a viewfinder display for a compact camera according to a second embodiment of the present invention.

FIG. 8 is a schematic view showing a viewfinder display for a compact camera according to a second embodiment of the present invention. In FIG. 8, a viewfinder display 25 for a compact camera is composed of a viewfinder objective lens 26, a holographic optical element 28 locating at the imaging position of the viewfinder objective lens 26, and a lens 27 for observing an object light from the viewfinder objective lens 26 and given information from the holographic optical element 28. Moreover, the light source 9 for illuminating the holographic optical element 28, and the driver 10 for electrically controlling optical characteristic of the holographic optical element 28 are arranged. Here, the construction of the holographic optical element 28 is the same as that of the holographic optical element according to the first embodiment except transparent electrodes 29a and 29b described later. Incidentally, the same reference symbol is attached to the same portion as the first embodiment and the duplicated explanations are omitted.

Figure 9A:
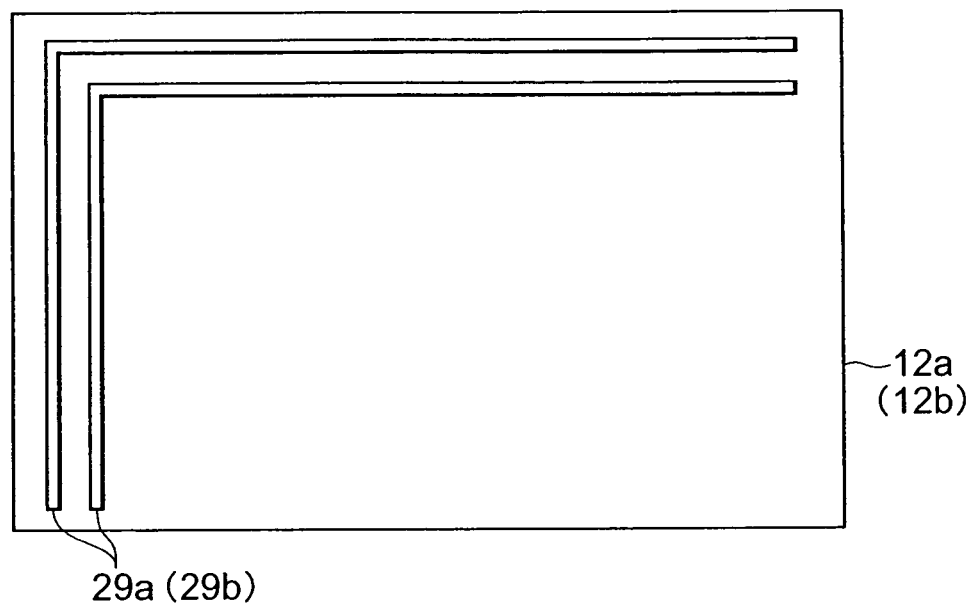
FIGS. 9A and 9B are views respectively showing transparent electrodes of a holographic optical element and an example of information displayed in the field of the viewfinder according to the second embodiment of the present invention.

In the holographic optical element 28, transparent electrodes 29a and 29b are arranged on each glass plate 12a and 12b forming L-shapes as shown in FIG. 9A. FIG. 9A is a view showing transparent electrodes 29a and 29b of a holographic optical element 28 according to the second embodiment of the present invention. With this arrangement, an L-shaped line is displayed in the field of the viewfinder as a field frame. The transparent electrodes 29a and 29b are not limited to an L-shape, and it can naturally be used in combination with a transparent electrode with a figure and a letter shape described in the first embodiment.

In this kind of viewfinder display 25 for a compact camera, the object light from the object passes through the viewfinder objective lens 26, the holographic optical element 28, and is observed by a photographer through the lens 27.

Then, the light emitted from the light source 9 is incident to the holographic optical element 28, and diffracted by the holographic optical element 28 in the direction of the lens 27 (to the right in the figure). The diffracted light is observed by the photographer as given information through the lens 27.

Figure 9B:
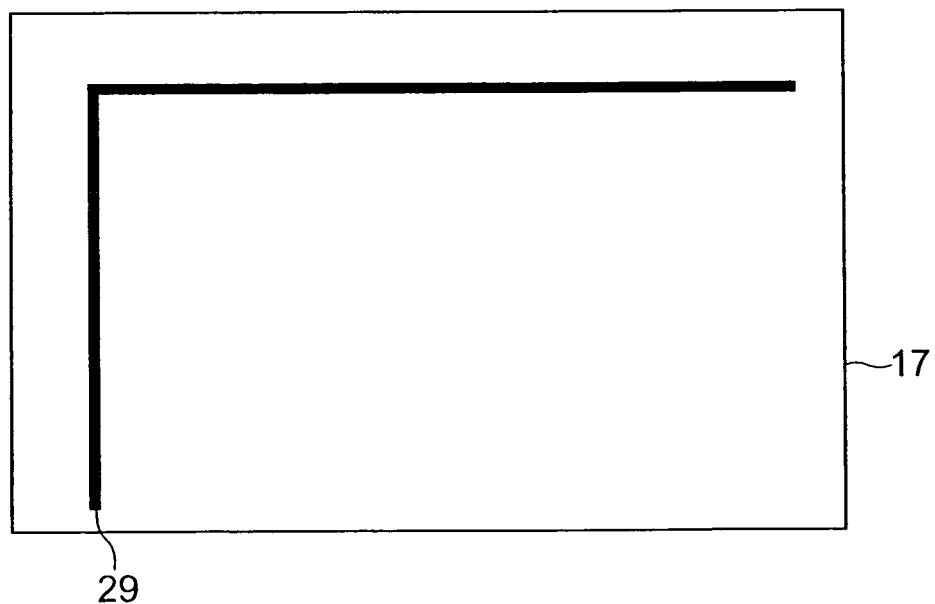

With the construction described above, since given information (L-shaped field frame) is displayed in the field of the viewfinder superimposing with the above-described object image, the photographer can observe given information together with the object image. An example of information (field frame 29) displayed in the field of the viewfinder 17 according to the present embodiment is shown in FIG. 9B. Here, FIG. 9B is a view showing an example of information (field frame 29) displayed in the field of the viewfinder 17 according to the second embodiment.

In a compact camera, differing from a single-lens-reflex camera, a photographic lens and a viewfinder are arranged separately with each other. Accordingly, a displacement between the field of the viewfinder (whole area to be observed in the field of the viewfinder) and the shooting area (actual photographing area on the film) of the photographic lens is produced in accordance with the distance from the compact camera to the object, which is a so-called "parallax".

With the construction described above, the viewfinder display for a compact camera according to the present embodiment makes it possible to correct the parallax by displaying a field frame in the field of the viewfinder indicating the shooting area in accordance with the shooting distance (the distance from the compact camera to the object).

Moreover, the viewfinder display for a compact camera according to the present embodiment makes it possible to observe the shooting area of the photographic lens indicated by the field frame in the field of the viewfinder together with the other area (the area that is not photographed on the film). Accordingly, it is very effective for choosing compositional arrangement upon displaying the shooting area in response to changing shooting mode such as a normal mode and a panoramic mode.

As described above, by using the holographic optical element constructed by the liquid crystal and the ultraviolet-setting liquid crystal, the viewfinder display for a compact camera according to the second embodiment makes it possible to show various superimposed displays for various information with securing a bright viewfinder image as same as the first embodiment.

The present invention makes it possible to provide a holographic optical element, a viewfinder display of a camera, and a camera that make it possible to show various superimposed displays for various information with securing a bright viewfinder image.

What is claimed is:

1. A viewfinder display of a camera displaying given information superimposed with an object image, the viewfinder display comprising:
   a first transparent member which has a board shape and on which object light is incident;
   a second transparent member which has a board shape and is separately disposed from the first transparent member facing the first transparent member, and from which the object light incident on the first transparent member leaves;
   transparent electrodes formed on the first transparent member and the second transparent member, respectively, and facing each other;
   a first liquid crystal whose orientation is changeable; and
   a second liquid crystal whose orientation is fixed;
   the first liquid crystal and the second liquid crystal being arranged alternately in a first direction with a striped shape between the transparent members on which the transparent electrodes are formed facing each other,
   wherein the viewfinder display has an incident surface on which light crossing a direction of an optical path of the object light is incident, and the incident surface crosses an exit surface from which the object light leaves the second transparent member, and crosses the first direction, and
   wherein the light incident on the incident surface is diffracted by the first liquid crystal and the second liquid crystal and leaves from the exit surface.

2. The viewfinder display of a camera according to claim 1, wherein the transparent electrodes are arranged on the transparent members such that the transparent electrodes form a figure shape and a letter shape, and the figure and the letter are displayed as the given information.

3. The viewfinder display of a camera according to claim 1, wherein the transparent electrodes are arranged on the transparent members such that the given information is displayed as a dot-matrix.

4. A viewfinder display of a camera displaying given information superimposed with an object image, the viewfinder display using a combination of a plurality of holographic optical elements, each holographic optical element comprising:
   a first transparent member which has a board shape and on which object light is incident;
   a second transparent member which has a board shape and is separately disposed from the first transparent member facing the first transparent member, and from which the object light incident on the first transparent member leaves;
   transparent electrodes formed on the first transparent member and the second transparent member, respectively, and facing each other;
   a first liquid crystal whose orientation is changeable; and
   a second liquid crystal whose orientation is fixed;
   the first liquid crystal and the second liquid crystal being arranged alternately in a first direction with a striped shape between the transparent members on which the transparent electrodes are formed facing each other,
   wherein each holographic optical element has an incident surface on which light crossing a direction of an optical path of the object light is incident, and the incident surface crosses an exit surface from which the object light leaves the second transparent member, and crosses the first direction, and
   wherein the light incident on the incident surface is diffracted by the first liquid crystal and the second liquid crystal and leaves from the exit surface.

5. A camera in which the viewfinder display of a camera according to claim 1 has a screen on which an object image is formed.

6. A camera in which the viewfinder display of a camera according to claim 4 has a screen on which an object image is formed.

7. The viewfinder display of a camera according to claim 1, further comprising a light source that emits light incident on the incident surface.

8. The viewfinder display of a camera according to claim 7, wherein the light source emits light incident on the incident surface irrespective of whether voltage is applied to the transparent electrodes.

9. The viewfinder display of a camera according to claim 1, wherein the second liquid crystal is an ultraviolet-setting liquid crystal.

10. The viewfinder display of a camera according to claim 1, wherein with no-voltage applied between the transparent electrodes, orientation of the first liquid crystal is the same as that of the second liquid crystal, and with voltage applied between the transparent electrodes, orientation of the first liquid crystal is different from that of the second liquid crystal, so that light incident on the incident surface is diffracted.

11. The viewfinder display of a camera according to claim 1, wherein with no-voltage applied between the transparent electrodes, orientation of the first liquid crystal is different from that of the second liquid crystal, and with voltage applied between the transparent electrodes, orientation of the first liquid crystal is the same as that of the second liquid crystal, so that with no-voltage applied, light incident on the incident surface is diffracted.

12. The viewfinder display of a camera according to claim 4, wherein the plurality of holographic optical elements are combined as layers.

13. The viewfinder display of a camera according to claim 4, wherein the plurality of holographic optical elements are operated in turn with time-sharing.

14. A camera comprising:
    the viewfinder display of a camera according to claim 1 having a focusing screen on which an image is formed by a photographic lens;
    wherein the viewfinder display is disposed along an optical axis of the photographic lens.

15. The camera according to claim 14, further comprising:
    a light source for emitting light incident on the incident surface.

16. A method for displaying in a viewfinder of a camera comprising steps of:
    providing a first transparent member which has a board shape and on which object light is incident;
    providing a second transparent member which has a board shape and is separately disposed from the first transparent member facing the first transparent member;
    providing transparent electrodes formed on the first transparent member and the second transparent member, respectively, and facing each other;

disposing a first liquid crystal whose orientation is changeable and a second liquid crystal whose orientation is fixed between the transparent electrodes which are facing each other such that the first liquid crystal and the second liquid crystal are arranged alternately in a first direction with a striped shape;

disposing an incident surface on which light crossing a direction of an optical path of the object light is incident, the incident surface crossing an exit surface from which the object light leaves the second transparent member, and crossing the first direction; and emitting the light from the exit surface, which is incident on the incident surface, and diffracted by the first liquid crystal and the second liquid crystal.

17. The method for displaying in a viewfinder of a camera according to claim 16, further comprising a step of:

arranging the transparent electrodes on the transparent members such that the transparent electrodes form a figure shape and a letter shape, and the figure and the letter are displayed as given information.

18. The method for displaying in a viewfinder of a camera according to claim 16, further comprising a step of:

arranging the transparent electrodes such that given information is displayed as a dot-matrix.

19. A method for displaying in a viewfinder of a camera comprising steps of:

providing a plurality of holographic elements, each formed by:

providing a first transparent member which has a board shape and on which object light is incident;

providing a second transparent member which has a board shape and is separately disposed from the first transparent member facing the first transparent member;

providing transparent electrodes formed on the first transparent member and the second transparent member, respectively, and facing each other;

disposing a first liquid crystal whose orientation is changeable and a second liquid crystal whose orientation is fixed between the transparent electrodes which are facing each other such that the first liquid crystal and the second liquid crystal are arranged alternately in a first direction with a striped shape;

disposing an incident surface on which light crossing a direction of an optical path of the object light is incident, the incident surface crossing an exit surface from which the object light leaves the second transparent member, and crossing the first direction; and emitting the light from the exit surface, which is incident on the incident surface, and diffracted by the first liquid crystal and the second liquid crystal.

20. The method for displaying in a viewfinder of a camera according to claim 16, further comprising a step of:

providing a light source that emits light incident on the incident surface.

21. The method for displaying in a viewfinder of a camera according to claim 20, further comprising a step of:

emitting from the light source light incident on the incident surface irrespective of whether voltage is applied to the transparent electrodes.

22. The method for displaying in a viewfinder of a camera according to claim 16, further comprising a step of:

diffracting light incident on the incident surface by applying voltage between the transparent electrodes, orientation of the first liquid crystal being the same as that of the second liquid crystal when no-voltage is applied, so that with voltage applied between the transparent electrodes, orientation of the first liquid crystal is different from that of the second liquid crystal.

23. The method for displaying in a viewfinder of a camera according to claim 16, further comprising a step of:

diffracting light incident on the incident surface when no-voltage is applied between the transparent electrodes, orientation of the first liquid crystal being different from that of the second liquid crystal when no-voltage is applied, and orientation of the first liquid crystal being the same as that of the second liquid crystal when voltage is applied.

24. The method for displaying in a viewfinder of a camera according to claim 19, further comprising a step of:

combining the plurality of holographic optical elements as layers.

25. The method for displaying in a viewfinder of a camera according to claim 19, further comprising a step of:

operating the plurality of holographic optical elements in turn with time-sharing.

* * * * *